United States Patent
Sakuma et al.

(10) Patent No.: US 11,740,404 B2
(45) Date of Patent: Aug. 29, 2023

(54) OPTICAL FIBER

(71) Applicant: SUMITOMO ELECTRIC INDUSTRIES, LTD., Osaka (JP)

(72) Inventors: Hirotaka Sakuma, Osaka (JP); Yoshiaki Tamura, Osaka (JP); Yuki Kawaguchi, Osaka (JP); Masato Suzuki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 249 days.

(21) Appl. No.: 17/339,623

(22) Filed: Jun. 4, 2021

(65) Prior Publication Data

US 2021/0294028 A1 Sep. 23, 2021

Related U.S. Application Data

(63) Continuation of application No. PCT/JP2019/045675, filed on Nov. 21, 2019.

(30) Foreign Application Priority Data

Dec. 13, 2018 (JP) .................... 2018-233536

(51) Int. Cl.
*G02B 6/02* (2006.01)

(52) U.S. Cl.
CPC .............. *G02B 6/02395* (2013.01)

(58) Field of Classification Search
CPC ............ G02B 6/02395; G02B 6/03694; C03B 37/018; C03B 2201/12; C03B 2201/20; C03B 2201/28; C03B 2201/50; C03B 2201/54; Y02P 40/57
See application file for complete search history.

(56) References Cited

U.S. PATENT DOCUMENTS

| | | | |
|---|---|---|---|
| 9,052,433 B2 | 6/2015 | Dianov et al. | |
| 2002/0017115 A1 | 2/2002 | Wei | |
| 2003/0024276 A1* | 2/2003 | Anderson | C03C 13/046 65/390 |
| 2007/0081779 A1 | 4/2007 | Flammer | |
| 2008/0152288 A1* | 6/2008 | Flammer | G02B 6/03694 385/124 |
| 2013/0294737 A1 | 11/2013 | Dianov et al. | |

(Continued)

FOREIGN PATENT DOCUMENTS

| | | | | |
|---|---|---|---|---|
| CN | 1278927 A | * | 1/2001 | .......... C03C 13/043 |
| CN | 106842412 A | * | 6/2017 | ....... C03B 37/01208 |

(Continued)

*Primary Examiner* — Ellen E Kim
(74) *Attorney, Agent, or Firm* — Faegre Drinker Biddle & Reath LLP

(57) ABSTRACT

One embodiment of the present disclosure relates to an optical fiber having lower transmission loss. The optical fiber is an optical fiber comprised of silica-based glass and includes a core including a central axis and a cladding. The cladding surrounds the core and has a refractive index lower than a refractive index of the core. The core contains phosphorus, chlorine, and fluorine. The core further includes an alkali metal element or an alkaline earth metal element. In a cross section of the optical fiber orthogonal to the central axis, a ratio Rp/Ra of a radius Rp of a phosphorus-containing region with respect to a radius Ra of the core is 0.3 or more.

10 Claims, 4 Drawing Sheets

(56) References Cited

U.S. PATENT DOCUMENTS

| | | | |
|---|---|---|---|
| 2013/0336343 A1 | 12/2013 | Miyabe et al. | |
| 2016/0304392 A1 | 10/2016 | Bookbinder et al. | |
| 2016/0370540 A1* | 12/2016 | Balemarthy | G02B 6/03627 |
| 2017/0022094 A1 | 1/2017 | Yan et al. | |
| 2019/0154911 A1 | 5/2019 | Bookbinder et al. | |

FOREIGN PATENT DOCUMENTS

| | | | |
|---|---|---|---|
| JP | 2004-530621 A | 10/2004 | |
| JP | 2007-079563 A | 3/2007 | |
| JP | 2009-541796 A | 11/2009 | |
| JP | 2014-506682 A | 3/2014 | |
| JP | 2016-519333 A | 6/2016 | |
| JP | 2017-027050 A | 2/2017 | |
| JP | 2018-516386 A | 6/2018 | |
| WO | WO-02/096817 A1 | 12/2002 | |
| WO | WO-2007/149344 A1 | 12/2007 | |
| WO | WO-2012/099498 A2 | 7/2012 | |
| WO | WO-2013/038794 A1 | 3/2013 | |
| WO | WO-2014/168739 A1 | 10/2014 | |
| WO | WO-2016/168042 A1 | 10/2016 | |

* cited by examiner

Fig. 2

| | CORE RADIUS Ra | P-CONTAINING-REGION RADIUS Rp | Rp/Ra | $\alpha_{1.55}$ [dB/km] | CUT-OFF WAVELENGTH [nm] | Aeff [$\mu m^2$] | MASS FRACTION (AVERAGE VALUE) OF K IN CORE | MASS FRACTION (AVERAGE VALUE) OF P IN CORE | BENDING LOSS [dB/m] | RATIO OF P (MASS FRACTION AT POSITION OF RADIUS Ra / PEAK MASS FRACTION) | MASS FRACTION (AVERAGE VALUE) OF F IN CORE |
|---|---|---|---|---|---|---|---|---|---|---|---|
| FIBER1 | 7.0 | 1.3 | 0.19 | 0.153 | 1505 | 148 | $32 \times 10^{-6}$ | 0.035 | N/A | N/A | 0.001 |
| FIBER2 | 6.8 | 2.5 | 0.37 | 0.148 | 1515 | 148 | $32 \times 10^{-6}$ | 0.033 | N/A | N/A | 0.002 |
| FIBER3 | 6.9 | 3.7 | 0.54 | 0.146 | 1496 | 148 | $31 \times 10^{-6}$ | 0.033 | N/A | N/A | 0.002 |
| FIBER4 | 6.9 | 5.1 | 0.74 | 0.143 | 1503 | 149 | $35 \times 10^{-6}$ | 0.031 | N/A | N/A | 0.003 |
| FIBER5 | 6.9 | 6.2 | 0.90 | 0.143 | 1526 | 152 | $33 \times 10^{-6}$ | 0.034 | N/A | N/A | 0.002 |
| FIBER6 | 6.9 | 7.0 | 1.01 | 0.145 | 1487 | 148 | $35 \times 10^{-6}$ | 0.033 | 9.9 | 0.83 | 0.003 |
| FIBER7 | 6.9 | 7.0 | 1.01 | 0.146 | 1490 | 148 | $30 \times 10^{-6}$ | 0.031 | 7.0 | 0.73 | 0.003 |
| FIBER8 | 6.8 | 8.3 | 1.22 | 0.147 | 1499 | 149 | $33 \times 10^{-6}$ | 0.034 | 6.5 | 0.65 | 0.001 |
| FIBER9 | 7.0 | 7.0 | 1.00 | 0.144 | 1521 | 149 | $34 \times 10^{-6}$ | 0.035 | 6.3 | 0.67 | 0.002 |
| FIBER10 | 6.9 | 6.8 | 0.99 | 0.147 | 1483 | 147 | $32 \times 10^{-6}$ | 0.005 | N/A | N/A | 0.003 |
| FIBER11 | 6.9 | 6.9 | 1.01 | 0.143 | 1488 | 150 | $33 \times 10^{-6}$ | 0.020 | 5.2 | 0.5 | 0.002 |
| FIBER12 | 6.9 | 6.7 | 0.97 | 0.142 | 1521 | 149 | $33 \times 10^{-6}$ | 0.040 | N/A | N/A | 0.002 |
| FIBER13 | 6.9 | 6.8 | 0.98 | 0.145 | 1481 | 151 | $32 \times 10^{-6}$ | 0.060 | N/A | N/A | 0.002 |

OPTICAL FIBER

CROSS-REFERENCE TO RELATED APPLICATIONS

This application is a continuation application of PCT/JP2019/045675 claiming the benefit of priority of the Japanese Patent Application No. 2018-233536 filed on Dec. 13, 2018, the entire contents of which are incorporated herein by reference.

TECHNICAL FIELD

The present disclosure relates to an optical fiber.

BACKGROUND ART

In order to reduce the loss of an optical fiber comprised of silica-based glass, it is known that a core contains chlorine (Cl) or fluorine (F), that a core contains an alkali metal element such as potassium (K), or the like. If the core portion of an optical fiber preform contains these elements, the viscosity of the core of the optical fiber obtained by drawing the optical fiber preform is reduced. As the viscosity of the core is reduced, the rearrangement of the glass in the core is promoted, and the transmission loss of the manufactured optical fiber due to the ray scattering is reduced.

In addition, it is known that an optical fiber having low transmission loss can be obtained with a core further containing phosphorus (P) (see Patent Document 1). Patent Document 1 discloses that defects in the glass structure represented by D2 line intensity are reduced if silica glass contains an appropriate amount of phosphorus, and the reduction of defects in the glass structure reduces transmission loss. Meanwhile, it also discloses that the transmission loss is increased due to the infrared absorption of phosphor oxide if the silica glass contains a large amount of phosphorus. It discloses that, considering the balance between them, the appropriate phosphorus concentration of silica glass is 0.2% or more and 2% or less. Patent Document 1 further discloses that an optical fiber having transmission loss of 0.16 dB/km at a wavelength of 1550 nm can be obtained.

CITATION LIST

Patent Literature

Patent Document 1: Japanese Patent Application Laid-Open No. 2017-27050
Patent Document 2: Japanese Unexamined Patent Application Publication (Translation of PCT Application) No. 2009-541796

SUMMARY OF INVENTION

An optical fiber in the present disclosure is an optical fiber comprised of silica-based glass and includes a core including a central axis and a cladding. The cladding has a refractive index lower than a refractive index of the core. The core contains phosphorus, chlorine, and fluorine. The core further contains an alkali metal element or an alkaline earth metal element. In addition, a phosphorus-containing region containing the phosphorus is set in the optical fiber, and a ratio $Rp/Ra$ of a radius $Rp$ of the phosphorus-containing region with respect to a radius $Ra$ of the core is 0.3 or more in a cross section of the optical fiber orthogonal to the central axis.

BRIEF DESCRIPTION OF DRAWINGS

FIG. 2 is a table summarizing the specifications of 13 prototype samples (Fiber 1 to Fiber 13).

DESCRIPTION OF EMBODIMENT

Description of Embodiment of Present Disclosure

Figure 1:
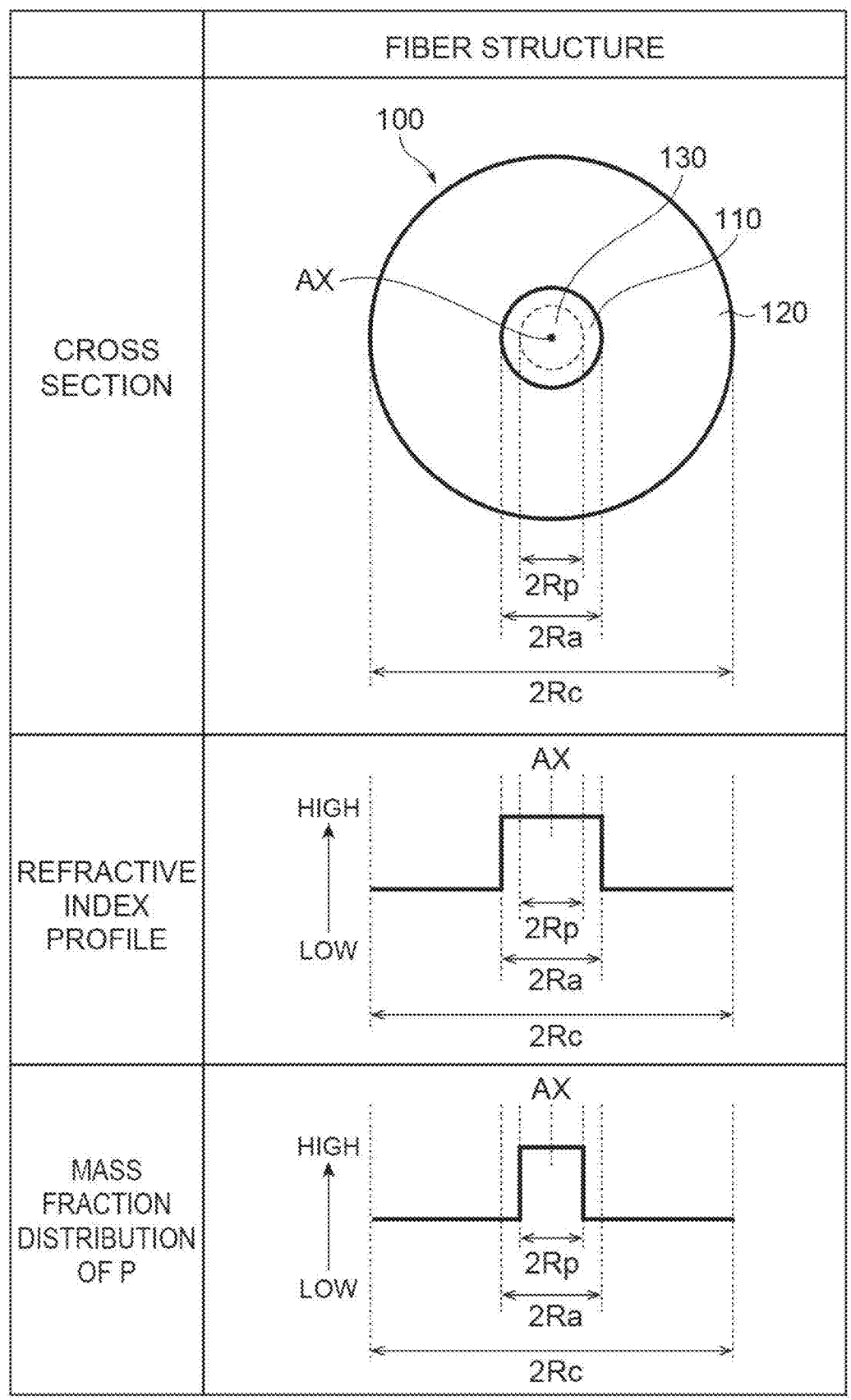
FIG. 1 is a diagram showing an example of a fiber structure (a cross-sectional structure, a refractive index profile, mass fraction distribution) of an optical fiber according to an embodiment of the present disclosure.

The present disclosure provides an optical fiber having lower transmission loss as compared with the conventional technique described above. Specifically, details of an embodiment of the present disclosure will be individually listed and described below.

(1) An optical fiber in the present disclosure is an optical fiber comprised of silica-based glass and includes, as an aspect, a core including a central axis and a cladding. The cladding has a refractive index lower than a refractive index of the core. The core contains phosphorus, chlorine, and fluorine. The core further contains an alkali metal element or an alkaline earth metal element. In addition, a phosphorus-containing region containing the phosphorus is a region set in the optical fiber and in the optical fiber along the central axis, and set in such a manner that a ratio $Rp/Ra$ of a radius $Rp$ of the phosphorus-containing region with respect to a radius $Ra$ of the core is 0.3 or more in a cross section of the optical fiber orthogonal to the central axis.

(2) As an aspect of the present disclosure, the ratio $Rp/Ra$ is preferably 0.6 or more, more preferably 1.0 or more. In addition, as an aspect of the present disclosure, the ratio $Rp/Ra$ is preferably 1.4 or less. As an aspect of the present disclosure, an average mass fraction of the phosphorus contained in the core is preferably 0.005 or more (an average weight concentration is 0.5 wt % or more). As an aspect of the present disclosure, the average mass fraction of the phosphorus contained in the core is preferably 0.06 or less.

(3) As one aspect of the present disclosure, an average mass fraction of the alkali metal element or the alkaline earth metal element contained in the core is preferably 0.0002 or less (an average weight concentration is 200 wt·ppm or less). In addition, as an aspect of the present disclosure, the alkali metal element or the alkaline earth metal element contained in the core is preferably any one selected from a group of sodium, potassium, rubidium, and cesium, or a combination of two or more selected from the group.

(4) As an aspect of the present disclosure, a ratio of an average mass fraction of the phosphorus in a range of 0.5 μm on both sides of a core/cladding interface separated from the central axis by the radius $Ra$ with respect to a peak mass fraction of the phosphorus in the phosphorus-containing region is 0.9 or less in the cross section of the optical fiber, more preferably 0.8 or less.

Each aspect listed in [Description of Embodiment of Present Disclosure] is applicable to each of the other aspects or all combinations of the other aspects.

Description of Embodiment of Present Disclosure

Hereinafter, a specific configuration of an optical fiber according to an embodiment of the present disclosure is described in detail with reference to the attached drawings. Note that, the present invention is not limited to examples to be described, is represented by claims, and includes all modifications within the meaning and scope equivalent to claims. In the description of the drawings, identical elements are denoted by the same reference signs, and overlapped descriptions are omitted.

As a result of diligent research on reducing the loss of an optical fiber, the inventors have acquired the following findings. If the core of an optical fiber comprised of silica-based glass contains phosphorus, as well as the average mass fraction of the phosphorus (average concentration of the phosphorus), the radius Rp of a region containing the phosphorus has a large effect on the transmission loss of the optical fiber. That is, in order to reduce the loss of an optical fiber, it is also important to set the radius Rp of a phosphorus-containing region in an appropriate range.

If the radius Rp of the phosphorus-containing region is smaller than the radius Ra of the core, the non-uniformity of the glass structure cannot be sufficiently reduced over the entire core. For this reason, the transmission loss cannot be sufficiently reduced, and it is difficult to reduce, for example, the transmission loss at a wavelength of 1550 nm to be 0.148 dB/km or less.

On the other hand, if the radius Rp of the phosphorus-containing region is larger than the radius Ra of the core, the transmission loss is determined by the balance of non-uniformity of the glass structure, increase in attenuation due to infrared absorption, and increase in scattering loss due to distortion caused by the viscosity difference near the boundary between the phosphorus-containing region and the phosphorus-free region.

In addition, if the radius Rp of the phosphorus-containing region is larger than the radius Ra of the core, the viscosity of the cladding is reduced, and compressive stress remains in the cladding. In such a situation, manufacturing an optical fiber under the same manufacturing conditions reduces the compressive stress of the core. For this reason, the non-uniformity of the glass structure in the core is insufficiently reduced, and the transmission loss cannot be sufficiently reduced.

Accordingly, in order to further reduce the loss of an optical fiber, it is important to set the radius Rp of the phosphorus-containing region in an appropriate range and, in particular, to set the ratio Rp/Ra of the radius Rp of the phosphorus-containing region with respect to the radius Ra of the core in an appropriate range. The embodiment of the present disclosure has been made based on the above findings of the inventors.

FIG. 1 is a diagram showing an example of a fiber structure of an optical fiber 100 according to an embodiment of the present disclosure. In FIG. 1, the upper row shows a cross-sectional view of the optical fiber 100, the middle row shows the refractive index profile of the optical fiber 100, and the lower row shows the mass fraction distribution of phosphorus in the optical fiber 100. The optical fiber 100 is comprised of silica-based glass and includes a core 110 having a central axis and a cladding 120 having an outer diameter of 2Rc surrounding the core 110. The core 110 has an outer diameter of 2Ra, and its refractive index is larger than the refractive index of the cladding 120. The core 110 contains phosphorus, chlorine, and fluorine, and a phosphorus-containing region 130 having an outer diameter of 2Rp is set in the optical fiber 100. The core 110 further contains an alkali metal element or an alkaline earth metal element. In the following, both the alkali metal element and the alkaline earth metal element are referred to as an "alkali metal element group" in this specification.

The average mass fraction of the alkali metal element group contained in the core 110 is 0.0002 or less. The alkali metal element group contained in the core 110 is any one selected from a group of sodium, potassium, rubidium, and cesium, or a combination of two or more selected from the group.

The ratio Rp/Ra of the radius Rp of the phosphorus-containing region 130 with respect to the radius Ra of the core 110 is 0.3 or more. The ratio Rp/Ra is preferably 0.6 or more, more preferably 1.0 or more. The upper limit of the ratio Rp/Ra is 1.4. The average mass fraction of the phosphorus contained in the core 110 is preferably 0.005 or more, preferably 0.06 or less. Although an example of Rp<Ra is shown in FIG. 1, the magnitude relation between Rp and Ra is not limited to Rp<Ra, and may be Rp=Ra, or Rp>Ra.

An optical fiber having a fiber structure as described above can be manufactured by, for example, drawing an optical fiber preform manufactured by the diffusion method disclosed in Patent Document 2. As an example, the core portion of the optical fiber preform is produced by the modified chemical vapor deposition (MCVD) method or the plasma activated chemical vapor deposition (PCVD) method. Specifically, when a dopant is doped to the inner wall surface of a glass pipe, steam containing phosphorus, chlorine, fluorine, and an alkali metal element group is supplied to the inside of the glass pipe. By collapsing this glass pipe, a core rod is produced. Then, a cladding portion is provided around the core rod by the outside vapor deposition method (OVD) method or the like, and an optical fiber preform is produced. By drawing the optical fiber preform, an optical fiber can be obtained.

FIG. 2 is a table summarizing the specifications of 13 prototype samples (Fiber 1 to Fiber 13). In each sample, the average mass fraction of the alkali metal element group contained in the core is 0.0002 or less. FIG. 2 shows successively, for the optical fiber of each sample, the radius Ra of the core (described as "core radius Ra" in the drawing), the radius Rp of the phosphorus-containing region (described as "P-containing-region radius Rp" in the drawing), the ratio of the radius Rp of the phosphorus-containing region with respect to the radius Ra of the core (described as "Rp/Ra" in the drawing), the transmission loss $\alpha$ at a wavelength 1550 nm (described as "$\alpha_{1.55}$ [dB/km]" in the drawing), the cut-off wavelength (described as "cut-off wavelength [nm]" in the drawing), the effective area $A_{eff}$ at a wavelength 1550 nm (described as "$A_{eff}$ [$\mu m^2$]" in the drawing), the average mass fraction of the potassium contained in the core (described as "mass fraction (average) of K in core" in the drawing), the average mass fraction of the phosphorus contained in the core (described as "mass fraction (average) of P in core" in the drawing), the bending loss at a wavelength of 1550 nm and a bending diameter of 20 mm (described as "bending loss [dB/m]" in the drawing), the ratio of the average mass fraction in the range of 0.5 $\mu$m on both sides of the core/cladding interface (radius Ra) with respect to the peak concentration of the phosphorus in the entire fiber (phosphorus-containing region) (described as "ratio of P (mass fraction at position of radius Ra/peak mass fraction)" in the drawing), and the average mass fraction of the fluorine in the core (described as "mass fraction (average) of F in core" in the drawing).

When the refractive index at a position separated by a distance r from the fiber central axis (corresponding to the central axis AX shown in FIG. 1) along the radial direction is n(r), the boundary between the core and the cladding is defined at the position where the differential value of the refractive index n(r) is the minimum (the steepest downward gradient) in the range in which the diameter is 20 µm or less and the relative refractive index difference is −0.2% or more.

When the mass fraction of the phosphorus at a position separated by the distance r from the fiber central axis along the radial direction is P(r) and the radius of the core is c, the average mass fraction of the phosphorus in the core is expressed by the following Formula (1):

$$\frac{2\int_0^c P(r)\cdot r\cdot dr}{c^2}. \qquad (1)$$

The same applies to the average mass fraction of each of other elements. In order to measure the mass fraction of an element, an electron probe micro analyzer (EPMA) is used to measure the polished cross section of an optical fiber along the radial direction from the central axis of the optical fiber. The measurement conditions are, for example, an acceleration voltage of 20 kV, a probe beam diameter of 1 µm or less, a measurement interval of 100 nm or less, and the measured value and a calibration curve obtained in advance are used to calculate the mass fraction.

Figure 3:
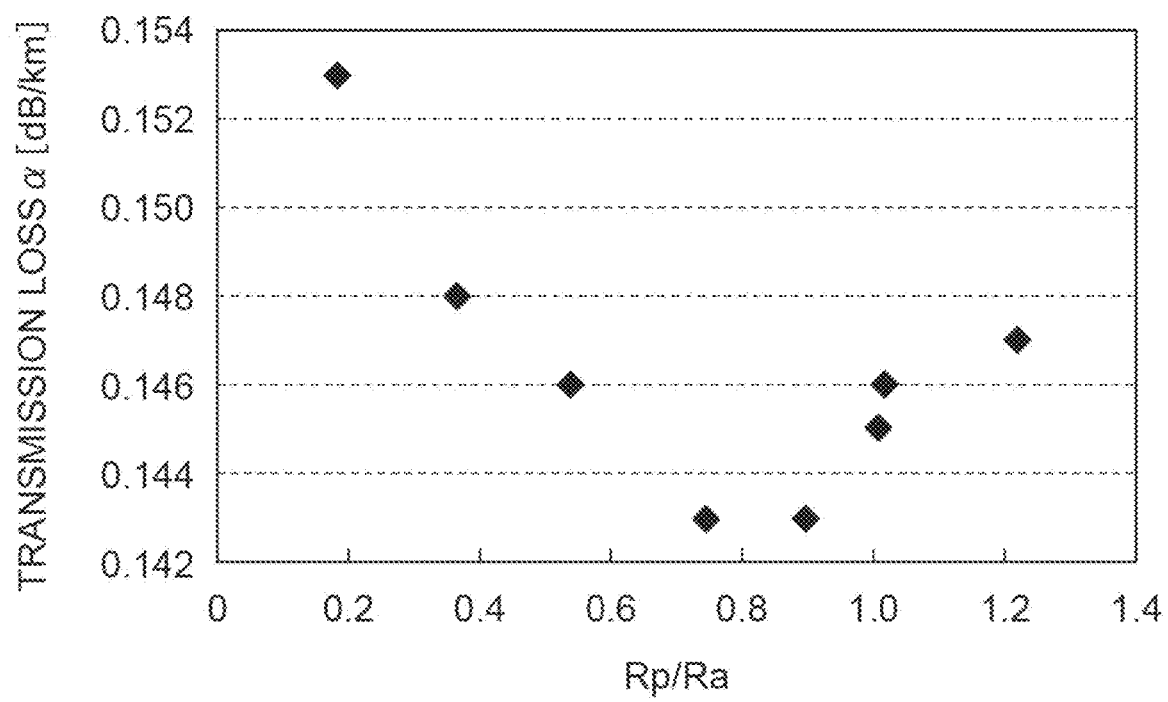
FIG. 3 is a graph plotting the relationship between the transmission loss at a wavelength of 1550 nm and a ratio $Rp/Ra$ for eight prototype samples (Fiber 1 to Fiber 8).

FIG. 3 is a graph plotting the relationship between the transmission loss α [dB/km] at a wavelength of 1550 nm and the ratio Rp/Ra for eight prototype samples (Fiber 1 to Fiber 8). As shown in this graph, the transmission loss at a wavelength of 1550 nm was the smallest value of 0.144 dB/km or less in the range in which the ratio Rp/Ra was 0.7 or more and 0.9 or less. In the range in which the ratio Rp/Ra was 0.4 or more and 1.2 or less, the transmission loss at a wavelength of 1550 nm was 0.148 dB/km or less, which was sufficiently small. In the range in which the ratio Rp/Ra was 0.3 or more, the transmission loss at a wavelength of 1550 nm was smaller than the transmission loss disclosed in Patent Document 1.

In the other ranges of the ratio Rp/Ra, the transmission loss was not sufficiently small. This is considered to be as follows. If the radius Rp of the phosphorus-containing region is small (the ratio Rp/Ra is less than 0.3), the non-uniformity of the glass structure cannot be reduced over the entire core. Thus, the transmission loss cannot be reduced. If the radius Rp of the phosphorus-containing region is large (the ratio Rp/Ra is larger than 1.4), the viscosity of the cladding is reduced, and compressive stress remains in the cladding. In this case, it is considered that the compressive stress of the core is reduced if an optical fiber is manufactured under the same manufacturing conditions. For this reason, the non-uniformity of the glass structure in the core is insufficiently reduced, and the transmission loss cannot be sufficiently reduced. Accordingly, in order to reduce the transmission loss at a wavelength of 1550 nm to 0.148 dB/km or less, the ratio Rp/Ra is preferably 0.3 or more and 1.4 or less.

Figure 4:
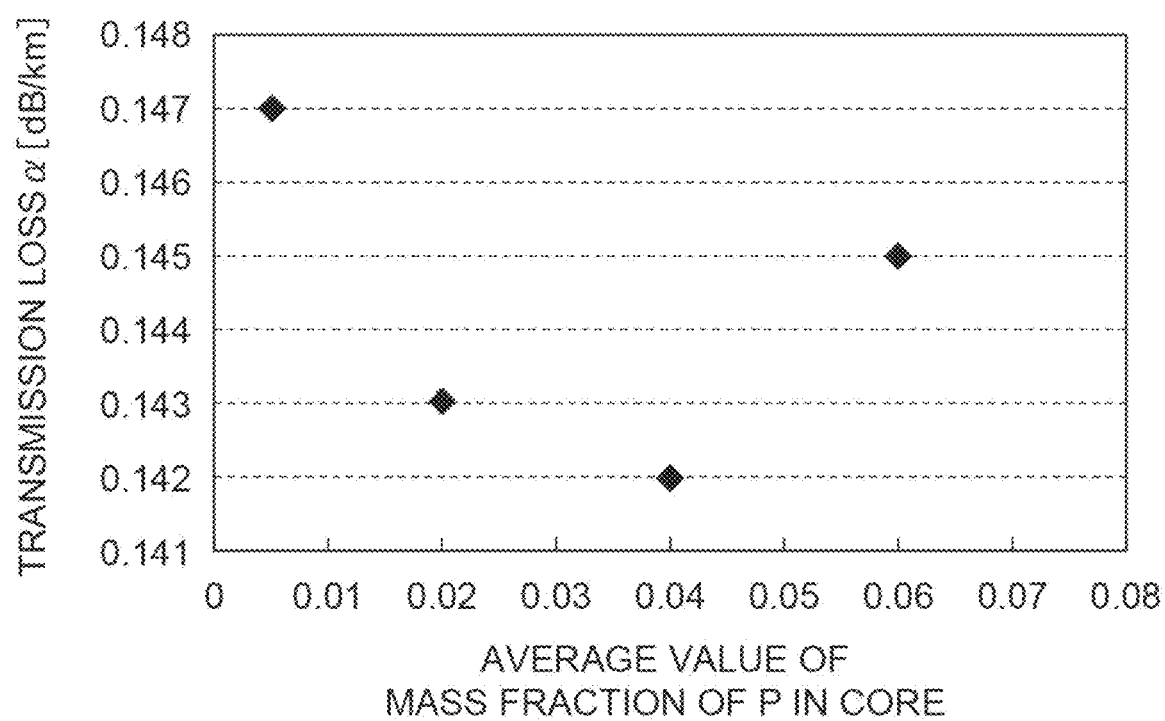
FIG. 4 is a graph plotting the relationship between the transmission loss at a wavelength of 1550 nm and an average mass fraction of phosphorus in a core for four prototype samples (Fiber 10 to Fiber 13).

FIG. 4 is a graph plotting the relationship between the transmission loss α [dB/km] at a wavelength of 1550 nm and the average mass fraction of the phosphorus contained in the core for the four prototype samples (Fiber 10 to Fiber 13). As shown in this graph, the transmission loss at a wavelength of 1550 nm was gradually reduced as the average mass fraction of the phosphorus contained in the core was increased, and the transmission loss started to increase when the average mass fraction of the phosphorus contained in the core exceeded 0.04. It is considered that this is because the increase in infrared absorption is larger than the non-uniformity of the glass structure.

In addition, as the ratio of the average mass fraction in the range of 0.5 µm on both sides of the position of the radius Ra (the core/cladding interface) with respect to the peak mass fraction of the phosphorus in the entire fiber (the cross section of the fiber orthogonal to the central axis AX) was smaller, the bending loss was able to be further reduced. It is presumed that since the refractive index is increased in a glass region doped with phosphorus, the refractive index profile of the core is a refractive index profile with a large α value, which is known to be able to reduce the bending loss. Accordingly, in order to reduce the bending loss, the above mass fraction ratio is preferably 0.9 or less, more preferably 0.8 or less.

The transmission loss also depends on the mass fraction of the alkali metal element group contained in the core. However, in the 13 samples (Fiber 1 to Fiber 13) shown in FIG. 2, the average mass fraction of the alkali metal element group contained in the core is standardized to about 0.00003, and its effect seems to be small. Various elements such as chlorine, fluorine, and the like contained in the core portion produced by the MCVD or PCVD can contain inhomogeneous portions with different refractive indexes called striae. However, the optical fiber in the present embodiment also contains striae, and containing striae does not matter in the low transmission loss.

REFERENCE SIGNS LIST

100 . . . Optical fiber; 110 . . . Core; 120 . . . Cladding; and 130 . . . Phosphorus-containing region.

The invention claimed is:

1. An optical fiber comprised of silica-based glass, the optical fiber comprising:
   a core including a central axis; and a cladding surrounding the core and having a refractive index lower than a refractive index of the core, wherein
   the core contains phosphorus, chlorine, and fluorine, the core containing an alkali metal element or an alkaline earth metal element, and
   a phosphorus-containing region containing the phosphorus is set in such a manner that a ratio Rp/Ra of a radius Rp of the phosphorus-containing region with respect to a radius Ra of the core is 0.3 or more, in a cross section of the optical fiber orthogonal to the central axis.

2. The optical fiber according to claim 1, wherein the ratio Rp/Ra is 0.6 or more.

3. The optical fiber according to claim 1, wherein the ratio Rp/Ra is 1.0 or more.

4. The optical fiber according to claim 1, wherein the ratio Rp/Ra is 1.4 or less.

5. The optical fiber according to claim 1, wherein an average mass fraction of the phosphorus contained in the core is 0.005 or more.

6. The optical fiber according to claim 1, wherein an average mass fraction of the phosphorus contained in the core is 0.06 or less.

7. The optical fiber according to claim 1, wherein
an average mass fraction of the alkali metal element or the alkaline earth metal element contained in the core is 0.0002 or less.
8. The optical fiber according to claim 1, wherein
the alkali metal element or the alkaline earth metal element contained in the core is any one selected from a group of sodium, potassium, rubidium, and cesium, or a combination of two or more selected from the group.
9. The optical fiber according to claim 1, wherein
a ratio of an average mass fraction of the phosphorus in a range of 0.5 μm on both sides of a core/cladding interface separated from the central axis by the radius Ra with respect to a peak mass fraction of the phosphorus in the phosphorus-containing region is 0.9 or less in the cross section.
10. The optical fiber according to claim 1, wherein
a ratio of an average mass fraction of the phosphorus in a range of 0.5 μm on both sides of a core/cladding interface separated from the central axis by the radius Ra with respect to a peak mass fraction of the phosphorus in the phosphorus-containing region is 0.8 or less in the cross section.

\* \* \* \* \*